(12) United States Patent
Sullivan

(10) Patent No.: US 12,480,841 B2
(45) Date of Patent: Nov. 25, 2025

(54) INTERSTITIAL FLUID CAPTURE DEVICE AND METHOD OF MEASURING ELECTROLYTE LEVELS USING SAME

(71) Applicant: Nicholas Sullivan, Powell, OH (US)

(72) Inventor: Nicholas Sullivan, Powell, OH (US)

( * ) Notice: Subject to any disclaimer, the term of this patent is extended or adjusted under 35 U.S.C. 154(b) by 1259 days.

(21) Appl. No.: 17/154,295

(22) Filed: Jan. 21, 2021

(65) Prior Publication Data

US 2022/0099654 A1    Mar. 31, 2022

Related U.S. Application Data

(60) Provisional application No. 63/083,997, filed on Sep. 27, 2020.

(51) Int. Cl.
*G01N 1/10* (2006.01)
*A61B 10/00* (2006.01)
(Continued)

(52) U.S. Cl.
CPC ........... *G01N 1/10* (2013.01); *A61B 10/0045* (2013.01); *G01N 1/02* (2013.01); *G01N 1/40* (2013.01);
(Continued)

(58) Field of Classification Search
None
See application file for complete search history.

(56) References Cited

U.S. PATENT DOCUMENTS 4,817,632 A * 4/1989 Schramm ........... A61B 10/0051
                                                    600/582
5,229,299 A    7/1993 Terry
(Continued)

FOREIGN PATENT DOCUMENTS

WO    WO-2020146045 A1 *  7/2020  ....... A61B 5/150099

OTHER PUBLICATIONS

Seshardi et al., Wearable sensors for monitoring the physiological and biochemical profile of the athlete, NPJ Digital Medicine Review Article, Published Jul. 22, 2019, 16 pages.
(Continued)

*Primary Examiner* — Lyle Alexander
*Assistant Examiner* — Mickey Huang
(74) *Attorney, Agent, or Firm* — Standley Law Group LLP; Adam J. Smith; Bryan P. Finneran

(57) ABSTRACT

Embodiments of the inventive concept include an interstitial fluid capture device configured to capture an interstitial fluid sample from the mouth of a user, an electrolyte measurement kit including said device, and a method for measuring electrolyte levels using said device. An exemplary device includes a main body portion configured for placement in the mouth of a user, the main body portion including a reservoir containing a hypertonic solution and having an opening that is sealed by a semipermeable membrane that permits a sample of interstitial fluid from the mouth of the user to be drawn through the membrane and into the solution reservoir. Various analyses may be performed on the captured interstitial fluid sample after removal of the device, including but not limited to, the assessment of one or more electrolyte levels through the use of various test strips or other techniques.

17 Claims, 3 Drawing Sheets

(51) Int. Cl.
*G01N 1/02* (2006.01)
*G01N 1/40* (2006.01)
*G01N 33/49* (2006.01)

(52) U.S. Cl.
CPC ...... *G01N 33/492* (2013.01); *A61B 2010/008* (2013.01); *G01N 2001/028* (2013.01); *G01N 2001/4016* (2013.01)

(56) References Cited

U.S. PATENT DOCUMENTS

| | | | |
|---|---|---|---|
| 6,102,872 A * | 8/2000 | Doneen | A61B 5/14532 422/50 |
| 2017/0254820 A1 * | 9/2017 | Lange | G01N 21/80 |
| 2020/0025686 A1 * | 1/2020 | Chou | G01N 21/78 |

OTHER PUBLICATIONS

Gao et al., Fully Integrated Wearable Sensor Arrays for Multiplexed in situ Perspiration Analysis, Manuscript, Jan. 28, 2016, 30 pages.
Hach, Chloride QuanTab Test Strips, 30-600 mg/L, webpage, accessed Aug. 31, 2021, 1 page.
Repligen, Spectra/Por 1-4 Standard RC Dialysis Membrane Discs, webpage, access Aug. 31, 2021, 4 pages.

* cited by examiner

INTERSTITIAL FLUID CAPTURE DEVICE AND METHOD OF MEASURING ELECTROLYTE LEVELS USING SAME

CROSS-REFERENCE TO RELATED APPLICATIONS

This application claims the benefit of U.S. Provisional Application No. 63/083,997, filed on Sep. 27, 2020, which is hereby incorporated by reference as if fully recited herein.

TECHNICAL FIELD

The inventive concept is directed to a device and method for capturing a sample of interstitial fluid from the mouth of a subject and for measuring/monitoring the level of one or more electrolytes present within said interstitial fluid.

BACKGROUND

The analysis of interstitial fluid (also frequently referred to as extracellular fluid) may be useful for a number of reasons. In one non-limiting example, interstitial fluid may be analyzed to measure the electrolyte level(s) of the subject from which the interstitial fluid was obtained.

An electrolyte, in the physiologic sense, is a substance (e.g., chloride, bicarbonate, calcium, sodium, potassium, magnesium) that forms an ion in a biological fluid and, therefore, has the capacity to carry an electric charge. Electrolytes affect many processes that occur in the human body, such as but not limited to those associated with brain function, nervous system communications and the proper operation of muscles. Other functions include, for example, balancing blood acidity and rebuilding damaged tissue. Clearly, electrolytes are vital to healthy body function.

A proper balance of electrolytes is also important for proper body function. When electrolytes become imbalanced, body functions may suffer. For example, an electrolyte imbalance may lead to conditions such as confusion or involuntary muscle contractions, and more seriously, to an irregular heartbeat and seizures. Numerous other irregular body functions may also result from an electrolyte imbalance.

Electrolyte imbalances can occur for a number of reasons. For example, an electrolyte imbalance may be the result of certain diseases, of a poor diet, or the taking of certain drugs. Other electrolyte imbalances—which may be more familiar to the average layperson—may result from insufficient hydration during exercise, or from extended periods of vomiting or diarrhea.

While a proper electrolyte balance is clearly important for proper body function, existing techniques for measuring/monitoring electrolyte levels are inconvenient, and/or available only to medical professionals. For example, athletes may attempt to indirectly estimate electrolyte levels and related hydration status based on a pre-workout-to-post-workout change in body weight or based on observed signs of dehydration. Direct measurement of electrolyte levels has generally required sending a blood sample to a laboratory—e.g., as part of a physician-ordered electrolyte panel (serum electrolyte test). Similar testing may also be done on a urine sample.

Due to the lack of a simple and accurate means of assessing electrolyte levels without visiting a physician, members of the general public (especially athletes and others participating in sports or other dehydrating activities) often simply assume that their electrolyte levels must have become imbalanced due to excessive sweating, etc., and attempt to compensate for said imbalance by consuming electrolyte-replenishing products such as hydration drinks. This is problematic not only because the electrolyte levels of such a person may not actually be imbalanced, but also because even if there is an imbalance, the person has no knowledge of the level of imbalance. As a result, many persons often consume hydration drinks or other functional beverages when doing so is unnecessary or consume such products far in excess of what is necessary, which may lead to the intake of much more sodium than is needed among other problems. Alternatively, a lack of knowledge of actual electrolyte imbalance may lead a person to consume only water when consumption of, e.g., a hydration drink, would actually be more appropriate and beneficial.

In light of the foregoing observations, there is a heretofore unmet need for a device and method that affords the general public the ability to easily assess and/or monitor their electrolyte levels. The various exemplary embodiments of the general inventive concept described herein meet this need.

SUMMARY

Broadly speaking, an interstitial fluid capture device according to the general inventive concept is an oral appliance that operates to draw interstitial fluid from the mouth tissue of a user and to retain said interstitial fluid for purposes of, for example, various types of assessment and/or monitoring. Exemplary interstitial fluid capture device devices according to the inventive concept are intended to function as wellness devices for allowing a user to quickly and easily assess information related to general health and wellness and are not intended as a substitute for actual medical devices nor to provide diagnostic information such as may be obtained from a physician or other appropriate clinician.

In one exemplary embodiment, which is primarily presented herein to generally describe an exemplary device and its method of use, interstitial fluid is drawn from the lip of a user. However, in other embodiments, an exemplary device according to the inventive concept may be designed and used to draw interstitial fluid from other areas inside the mouth of a user, such as but not limited to the cheek, and under the tongue.

In relation to the measure of electrolytes, as discussed above, an interstitial fluid sample drawn into the device may be used to assess and/or monitor one or more electrolyte levels, such as by contacting the captured interstitial fluid sample with one or more easy to use test strips (e.g., a chloride test strip), the nature and use of which would be well understood by one of skill in the art. Once captured by an interstitial fluid capture device, the interstitial fluid sample may also be used for other purposes.

One exemplary embodiment of an interstitial fluid capture device according to the general inventive concept includes a main body portion for positioning between the lip and the teeth of a user. While exemplary interstitial fluid capture device embodiments are described and/or shown herein as being designed for location between the lower lip and teeth of a user during use for purposes of ease of use and comfort, it is to be understood that an exemplary device may also be designed for location between the upper lip and teeth of a user during use, and/or a single exemplary device may be designed so as to be usable in either position. Further, an exemplary interstitial fluid capture device may also be designed for use along the cheek or under the tongue of a user.

The main body portion of an exemplary interstitial fluid capture device is preferably comprised of a flexible material such as medical grade silicone or another elastomeric material. Within the main body portion is an internal reservoir containing a solution that is hypertonic with respect to the interstitial fluid normally present within the mouth tissue of a user. The reservoir within the main body portion is sealed along the lip-contacting surface (fluid extraction side) thereof by a semipermeable membrane. When the main body portion is properly positioned within the mouth of a user, the semipermeable membrane is in contact with the user's lip (or cheek, etc.), and interstitial fluid (not saliva) will be drawn from the lip through the semipermeable membrane and into the hypertonic solution reservoir via means of osmosis.

Upon removal of the interstitial fluid capture device from the mouth, the hypertonic solution containing the interstitial fluid sample remains within the reservoir in the main body portion until the reservoir is deliberately accessed for assessment purposes or otherwise. With respect to electrolyte measurement, for example, one or more electrolyte test strips may be inserted into the reservoir to incubate the test strip(s) with the hypertonic solution-interstitial fluid mixture, the test strips thereafter operating to indicate the level of one or more electrolytes of interest (e.g., chloride, bicarbonate, calcium, sodium, potassium, magnesium) present in the interstitial fluid sample. Once the interstitial fluid sample has been accessed for the intended purpose(s), the entire device may be discarded.

In some exemplary embodiments, one or more interstitial fluid capture devices may be a part of a kit, which may include other elements related to use of the device(s) such as but not limited to, one or more test strips for measuring the level of one or more types of electrolytes.

In some exemplary embodiments, an interstitial fluid capture device or a kit including one or more interstitial fluid capture devices, may also include information such as but not limited to numerical data, tables, colorimetric or other types of charts, graphs, and/or any other form of information that allows a user to compare an electrolyte level reading obtained through use of an exemplary interstitial fluid capture device to an expected and/or proper electrolyte level or range of electrolyte levels.

In some exemplary embodiments, an interstitial fluid capture device or a kit including one or more interstitial fluid capture devices, may also include one or more other components that facilitate recording of a baseline electrolyte(s) level measurement(s) obtained through use of an interstitial fluid capture device, and subsequent recording and/or comparison of future electrolyte level measurements obtained through use of additional interstitial fluid capture devices to the baseline measurement(s).

Multiple interstitial fluid capture devices may be packaged together for purchase and use.

Use of the aforementioned exemplary interstitial fluid capture device is substantially as already described above. That is, a user (after any required unpackaging and/or unwrapping), places the interstitial fluid capture device in the mouth between the teeth and the lip such that the semipermeable membrane is in contact with the lip. After waiting some predetermined minimum amount of time during which an interstitial fluid sample will have been automatically drawn into the solution reservoir of the main body portion by the hypertonic solution, the device is simply removed from the mouth. The solution reservoir within the main body portion may thereafter be accessed to reach the interstitial fluid sample contained therein. Access to the solution reservoir may be accomplished for example, by penetration with an electrolyte or other test strip or perhaps with a needle or other implement, or the reservoir may be cut open with any of various instruments. An exemplary main body portion may be designed to facilitate access to the solution reservoir subsequent to sample capture and removal of the interstitial fluid capture device from the mouth of a user.

Other aspects and features of the inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

Figure 1A:
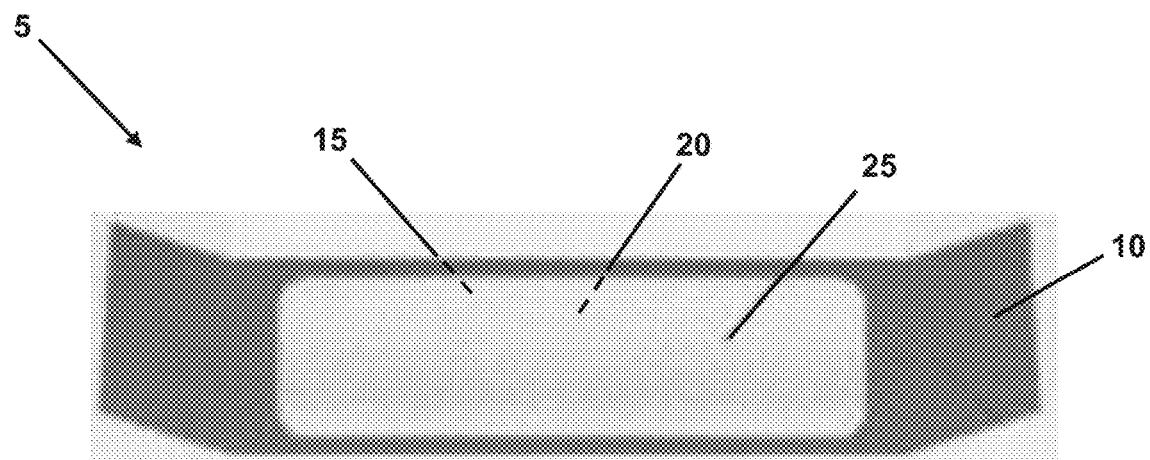
FIG. 1A is a front view of one exemplary embodiment of an interstitial fluid capture device according to the inventive concept.
Figure 1B:
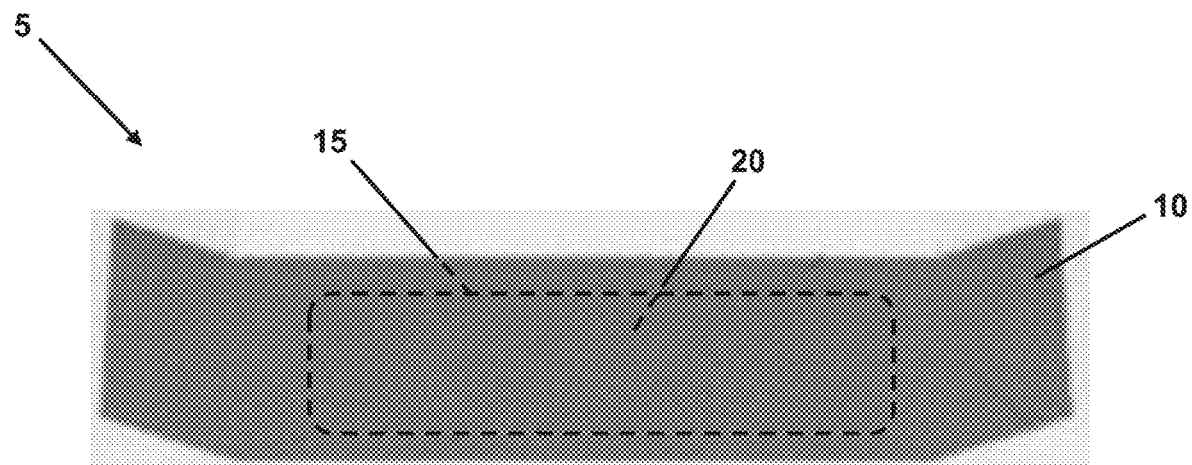
FIG. 1B is a rear view of the exemplary interstitial fluid capture device shown in FIG. 1A.

As previously explained, an interstitial fluid capture device according to the general inventive concept is an oral appliance that is designed for placement in the mouth of a user and operable to draw and retain interstitial fluid from the lip (or other mouth area) of the user for testing purposes. One exemplary embodiment of such an interstitial fluid capture device 5 is illustrated in the front view of FIG. 1A and the rear view of FIG. 1B.

The exemplary interstitial fluid capture device 5 includes a main body portion 10. The main body portion 10 may be specially shaped and dimensioned to facilitate placement and retention within the mouth of a user, or the main body portion may be of more basic shape, such as but not limited to, a tubular shape. In the exemplary embodiment shown, the main body portion 10 is designed for temporary retention between the teeth and lip of a user. However, other exemplary main body portions of other device embodiments may be designed for alternative placement within the mouth, such as without limitation, between the teeth and cheek, or under the tongue. An exemplary main body portion, such as the main body portion 10, is preferably comprised of an elastomeric material, such as but not limited to, medical grade silicone. The main body portion of an exemplary interstitial fluid capture device may also be comprised of other materials appropriate for oral application.

Figure 2:
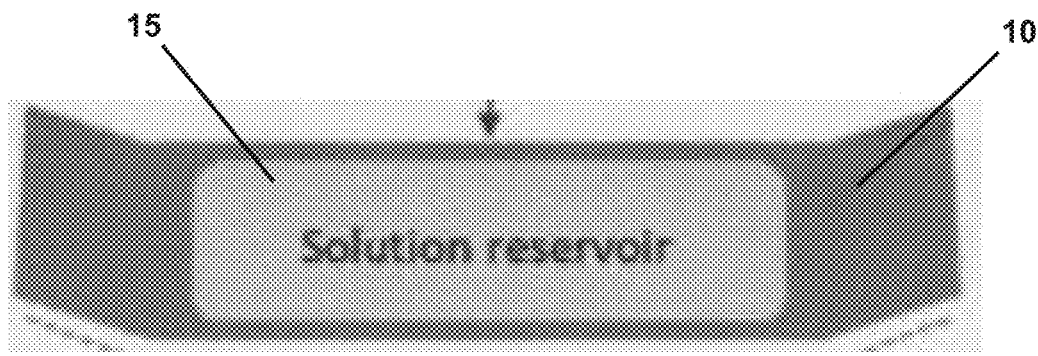
FIG. 2 is a front view of one exemplary embodiment of a main body portion of the exemplary interstitial fluid capture device shown in FIGS. 1A-1B.
Figure 3:
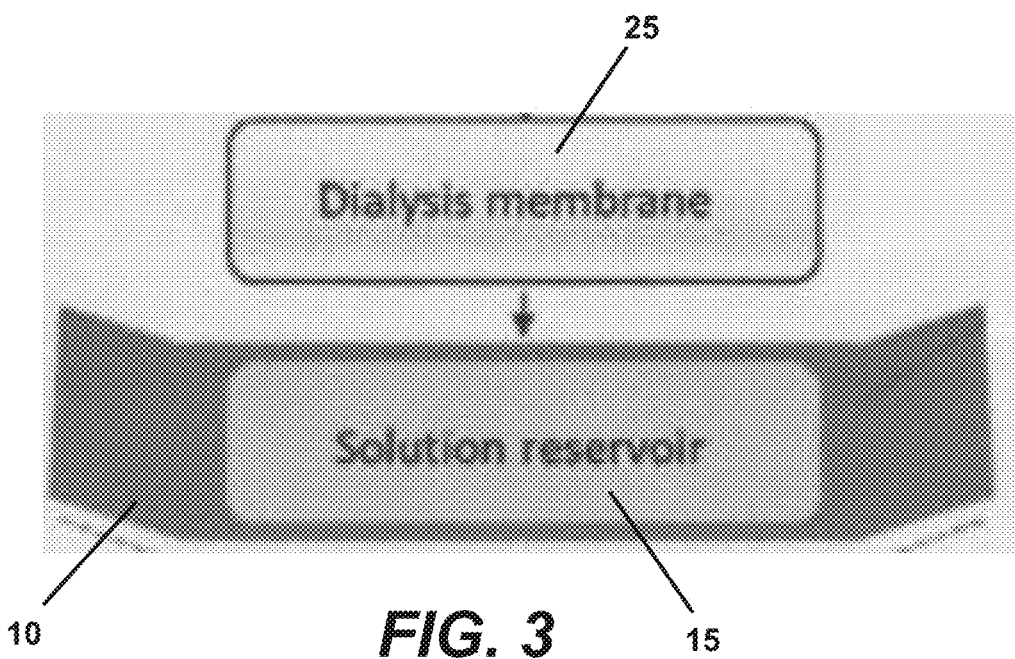
FIG. 3 represents installation of a semipermeable membrane over the solution reservoir that is located within the exemplary main body portion shown in FIG. 2.

As may be best observed in FIG. 2, the main body portion 10 includes an internal solution reservoir 15 that opens along the front (extraction or lip contacting) surface of the main body portion. Within the reservoir 15 is placed an amount of a highly concentrated, high molecular weight solution 20 that is hypertonic relative to the interstitial fluid normally present in a human lip. The hypertonic solution 20 is sealed within the reservoir 15 along the front surface of the main body portion 10 by a semipermeable (e.g., dialysis) membrane 25 that is installed thereto, as also represented in FIG. 3. Although the semipermeable membrane 25 of the exemplary interstitial fluid capture device 5 represented in FIG. 3 is a substantially flat membrane, a semipermeable membrane of tubular form (e.g., dialysis tubing) may be utilized in other exemplary interstitial fluid capture device embodiments.

Figure 4A:
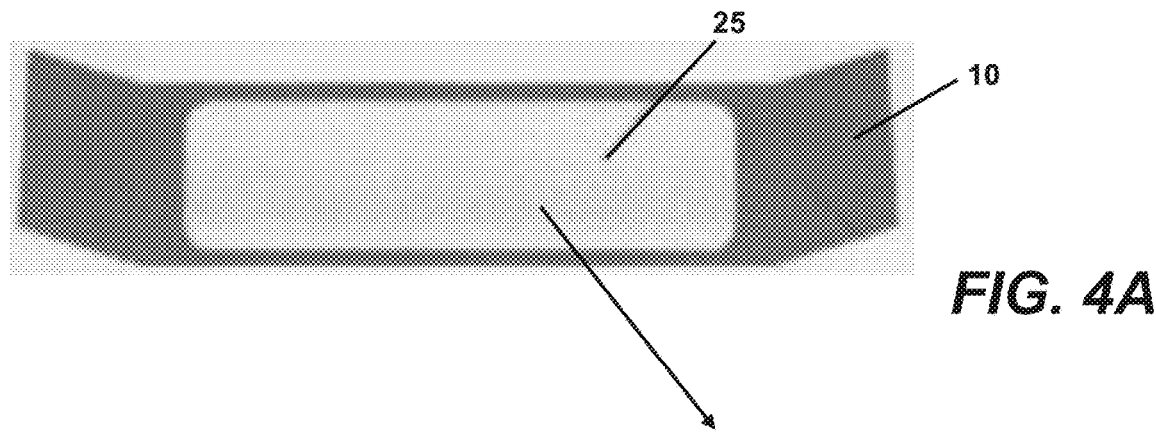
FIG. 4A represents the semipermeable membrane of FIG. 3 installed to the main body portion shown in FIG. 2 and covering the solution reservoir thereof.
Figure 4B:
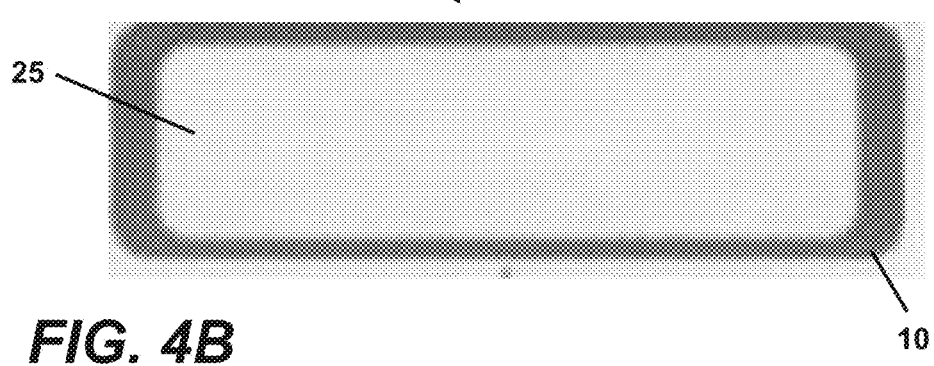
FIG. 4B is an enlarged view of a portion of FIG. 4A, indicating sealing of the edges of the semipermeable membrane by the material forming the main body portion.

FIGS. 4A-4B illustrate one technique by which the semipermeable membrane 25 may be sealed to the main body portion 10 so as to prevent leakage of the extraction solution 20 from the reservoir 15. Particularly, and as best illustrated in FIG. 4B, during manufacture of the exemplary interstitial fluid capture device 5, the material of which the main body portion 10 is comprised is molded or otherwise formed so as to overlap the edges of the semipermeable membrane 25. For example, the edges of the semipermeable membrane 25 may be embedded in or encapsulated by the material forming the main body portion 10 or may be trapped between layers thereof. Alternatively, a ring of the same material forming the main body portion (or another suitable material) may be overlaid upon the semipermeable membrane 25 to seal the edges thereof to the main body portion 10. Further, sealing of the semipermeable membrane 25 to the main body portion (and corresponding sealing of the solution reservoir 15) may be accomplished by other techniques in other device embodiments, such as without limitation, bonding the edges of the semipermeable membrane to the main body portion.

Figure 5:
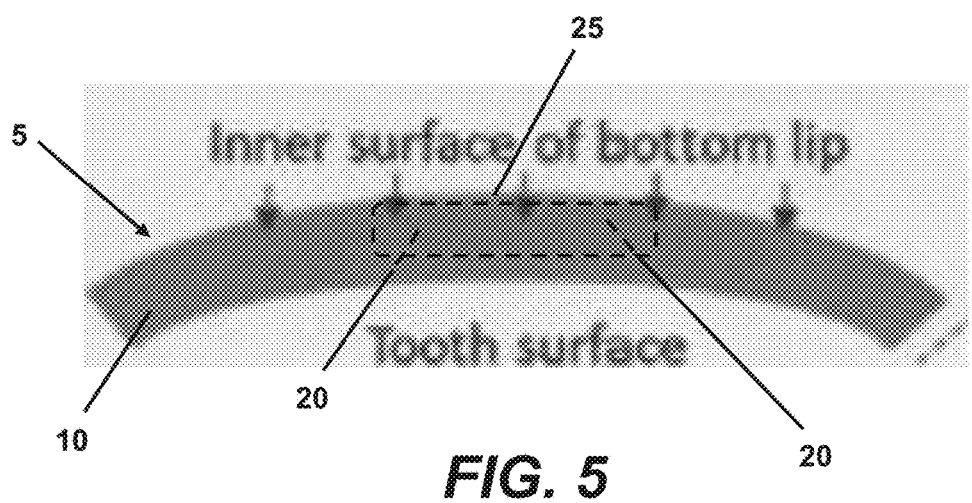
FIG. 5 is a top view of an exemplary interstitial fluid capture device comprising a main body portion with a hypertonic solution-filled internal reservoir sealed along a front surface thereof by a semipermeable membrane as variously represented in in the preceding drawing figures, and indicating proper orientation of an exemplary interstitial fluid capture device when located in the mouth of a user.

FIG. 5 depicts proper orientation of the exemplary interstitial fluid capture device 5 within the mouth of a user. Specifically, the rear of the interstitial fluid capture device 5 resides along the teeth of the user, while the front of the interstitial fluid capture device faces the inner surface of the user's lip. At least for ease of use and comfort, the exemplary interstitial fluid capture device 5 is contemplated as being designed for location between the lower lip and teeth of a user during use. However, it is to be understood that an exemplary interstitial fluid capture device may instead be designed for location between the upper lip and teeth of a user during use (or, as described above, against the cheek or under the tongue in other embodiments).

With the exemplary interstitial fluid capture device 5 positioned in the mouth of a user as described above, interstitial fluid (not saliva) will be automatically drawn from the user's lip through the semipermeable membrane 25 and into the solution reservoir 15, as indicated by the arrows in FIG. 5. As would be understood by one of skill in the art, this drawing of interstitial fluid from the lip of the user, through the dialysis membrane 25 and into the solution reservoir 15, occurs because of the hypertonic nature of the extraction solution 20. That is, interstitial fluid from the lip is drawn into the solution reservoir 15 by means of osmosis resulting from the solute concentration on the hypertonic solution side of the semipermeable membrane 25 and the solute concentration of the fluids in the user's lip on the opposite side of the semipermeable membrane, being unequal.

Upon sufficient extraction of interstitial fluid, the exemplary interstitial fluid capture device 5 may be removed from the mouth of the user. The interstitial fluid-hypertonic solution mixture remains within the solution reservoir 15 of the main body portion 10 until the reservoir is deliberately accessed for assessment purposes or otherwise. Once desired assessment, etc., of the captured interstitial fluid or other use of the exemplary interstitial fluid capture device 5 is complete, the device may be discarded.

In some exemplary embodiments, one or more interstitial fluid capture devices may be packaged with other items. For example, an interstitial fluid capture device or a collection of multiple interstitial fluid capture devices may be provided along with information that allows a user to compare an electrolyte reading obtained through use of an exemplary interstitial fluid capture device to an expected and/or proper electrolyte level or range of electrolyte levels. Such information may be provided in the form of numerical data, tables, charts, graphs, and/or any other form of information.

Similarly, exemplary embodiments may package one or more interstitial fluid capture devices with one or more other items that facilitate recording of a baseline electrolyte(s) measurement(s) obtained through use of an interstitial fluid capture device and subsequent recording and/or comparison of the baseline measurement(s) with future electrolyte measurements obtained through use of additional interstitial fluid capture devices.

Interstitial fluid capture devices according to the inventive concept may also form a part of a kit, such as for purposes of illustration and not limitation, a kit for assessing/monitoring electrolyte levels. Whatever the particular purpose, a kit that includes an interstitial fluid capture device may also include other elements related to use of the device(s). In the case of a kit for assessing/monitoring electrolyte levels, for example, the kit may also include one or more easy to use test strips for measuring the level of one or more types of electrolytes. The existence and use of test strips for measuring electrolytes such as, without limitation, chloride, bicarbonate, calcium, sodium, potassium, magnesium would be familiar to one of skill in the art.

To use the exemplary interstitial fluid capture device 5, a user places the device in his/her mouth between the teeth and the lip, such that the dialysis membrane is in contact with the lip. The device is retained in this position for a period of time that is sufficient to permit the device to extract an adequate amount of interstitial fluid from the user's lip in the manner explained above. The amount of time that an exemplary interstitial fluid capture device should be retained in the mouth of a user may be indicated on packaging, instructions, etc., provided with the device. Once the interstitial fluid capture device has been retained in the mouth of the user for a sufficient period of time, it may be thereafter removed.

The solution reservoir within the main body portion may subsequently be accessed to reach the interstitial fluid sample contained therein. Access to the solution reservoir may be accomplished for example, by penetration with the appropriate end of an electrolyte or other test strip, by penetration with a needle or similar implement, or the reservoir may simply be cut open. To facilitate access to the solution reservoir of an exemplary interstitial fluid capture device, an area of the main body portion that overlies at least a portion of the solution reservoir along a non-extraction side of the device may be thinner than other areas of the main body portion to allow for easier penetration by a test strip or other implement.

With respect to electrolyte measurement, for example, an electrolyte test strip may be inserted into the reservoir to contact the test strip with the extraction solution-interstitial fluid mixture, and the test strip may thereafter be read or otherwise analyzed to assess the level of the electrolyte for which the test strip is designed (e.g., chloride). Other test strips may be simultaneously or subsequently inserted into the solution reservoir to similarly determine the level of other electrolytes (e.g., bicarbonate, sodium, calcium, potassium, magnesium) present in the interstitial fluid sample. Once assessment, testing, etc., of the interstitial fluid sample has been completed, the entire device may be discarded.

Exemplary embodiments of an interstitial fluid capture device according to the inventive concept allow a user to easily, comfortably and cost effectively capture an interstitial fluid sample. Exemplary embodiments of an interstitial fluid capture device according to the inventive concept also allow a user to easily assess/monitor electrolyte levels or levels of other biomarkers and eliminate the need for drawing a blood sample or collecting a urine sample as is commonly required by known electrolyte measurement techniques. Exemplary embodiments of an interstitial fluid capture device according to the inventive concept further allow a user to assess/monitor electrolyte levels (or conduct other tests) without the need to engage a physician or other appropriate technician or send a blood or urine specimen to a lab, which reduces the costs to the user.

While the inventive concept and exemplary embodiments thereof have been described above with respect to use on and by human users, it is to be understood that exemplary embodiments may also be designed for and used to capture interstitial fluid from other mammals (e.g., dogs, horses)—at least those having a mouth structure to which a main body portion can be acceptably inserted and temporarily retained. As with the human uses described above, interstitial fluid captured from other animals may be used for various purposes, including but not limited to assessing/monitoring electrolyte levels.

While certain embodiments of the inventive concept are described in detail above, the scope of the inventive concept is not considered limited by such disclosure, and modifications are possible without departing from the spirit of the inventive concept as evidenced by the following claims:

What is claimed is:

1. An interstitial fluid capture device, comprising:
   a main body portion configured for temporary retention in a mouth of a user between an inner surface of a lip of the user's mouth and a forward surface of teeth of the user's mouth, said main body portion having an elongate shape defining a retained, curve shape which extends along a longitudinal axis of the main body portion and includes a curved inner surface which faces, contracts, and contours to the inner surface of the lip when the interstitial fluid capture device is worn and a curved outer surface which faces, contacts, and contours to the forward surface of the teeth when the interstitial fluid capture device is worn, and wherein the curved inner surface and the curved outer surface are co-direction and aligned such that the curved inner surface and curved outer surface define, at least in part, the retianed, curve shape;
   a solution reservoir located within, and defined at least in part by, the main body portion, the reservoir forming an opening along a fluid extraction side of the main body portion comprising the curved outer surface, wherein the main body portion is configured such that, when properly positioned in the mouth of the user, the fluid extraction side of the main body portion and the solution reservoir opening thereof faces the inner surface of the lip of the user, and the semipermeable membrane contacts the inner surface of the lip of the user;
   a solution residing in the solution reservoir of the main body portion, wherein the solution is hypertonic with respect to interstitial fluid present in the lip of a human mouth; and
   a semipermeable membrane covering the solution reservoir opening and sealing the hypertonic solution within the solution reservoir, the semipermeable membrane constructed from a material that permits the interstitial fluid from mouth tissue of the user, including through the inner surface of the lip of the user contacting the semipermeable membrane, to be drawn through the semipermeable membrane and into the solution reservoir during use and retained therein, and wherein said semipermeable membrane is penetrable by a test strip to access the interstitial fluid stored therein.

2. The interstitial fluid capture device of claim 1, wherein the main body portion comprises medical grade silicone.

3. The interstitial fluid capture device of claim 1, wherein the semipermeable membrane is a dialysis membrane.

4. The interstitial fluid capture device of claim 1, wherein the semipermeable membrane is sealed to the main body portion.

5. The interstitial fluid capture device of claim 4, wherein the semipermeable membrane is sealed to the main body portion by a technique selected from the group consisting of overmolding of edges of the semipermeable membrane by the main body portion, and bonding of the semipermeable membrane to the main body portion material.

6. The interstitial fluid capture device of claim 1, wherein the main body portion includes an area of thinned material that overlies at least a portion of the solution reservoir along a non-fluid extraction side of the main body portion to facilitate penetration of the solution reservoir by the test strip.

7. The interstitial fluid capture device of claim 1, wherein said semipermeable membrane and said solution are configured to cause the interstitial fluid to be drawn from mouth tissue of through the semipermeable membrane and into the solution reservoir by osmosis.

8. The interstitial fluid capture device of claim 7, wherein the hypertonic solution is within the solution reservoir is not hypertonic as to saliva.

9. An electrolyte measurement kit, comprising:
   the interstitial fluid capture device of claim 1; and
   at least one electrolyte test strip configured to penetrate the semipermeable membrane and measure the level of at least one electrolyte present in a sample of interstitial fluid captured by the interstitial fluid capture device by penetration of the semipermeable membrane.

10. The kit of claim 9, wherein a plurality of different types of test strips are present.

11. The kit of claim 10, wherein the plurality of different types of test strips are each configured to measure a level of a respective, distinct set of one or more electrolytes selected from the group comprising chloride, bicarbonate, calcium, sodium, potassium, magnesium.

12. The kit of claim 11, wherein the plurality of different types of test strips are configured to, collectively, measure the level of at least each of chloride, bicarbonate, calcium, sodium, potassium, magnesium.

13. A method of assessing at least one electrolyte level of a user, comprising:
   providing the interstitial fluid capture device of claim 1;
   placing the interstitial fluid capture device in the mouth of the user such that the curved inner surface contacts the forward surface of the teeth and the curved outer surface contracts the inner surface of the lip of the user;
   retaining the interstitial fluid capture device in the mouth of the user as placed for some amount of time sufficient to permit a sufficient sample of interstitial fluid to be drawn from the mouth of the user, through the semipermeable membrane, and into the solution reservoir;
   removing the interstitial fluid capture device from the mouth of the user; and
   inserting at least one electrolyte test strip into the solution reservoir of the interstitial fluid capture device, the at least one electrolyte test strip configured to measure the level of at least one electrolyte present in the sample of interstitial fluid present in the solution reservoir.

14. The method of claim 13, wherein a plurality of different types of test strips are used to measure a plurality of different electrolytes present in the interstitial fluid sample.

15. The method of claim 14, wherein the plurality of different types of test strips are used to measure the level of one or more electrolytes selected from the group comprising chloride, bicarbonate, calcium, sodium, potassium, magnesium.

16. The method of claim 13, further comprising comparing an electrolyte level reading obtained through use of the at least one test strip to an expected and/or proper electrolyte level or range of electrolyte levels.

17. The method of claim 13, further comprising recording a baseline electrolyte level obtained from the interstitial fluid sample captured by the interstitial fluid capture device, and comparing subsequent electrolyte level measurements obtained from additional interstitial fluid capture devices to the baseline measurement.

\* \* \* \* \*